US007242962B2

(12) United States Patent
Joffray et al.

(10) Patent No.: US 7,242,962 B2
(45) Date of Patent: Jul. 10, 2007

(54) DEVICE DELIVERING A SERVICE USING AN ASSOCIATED PORTABLE MEMORY, AND RELAYING MEANS FOR ALLOWING ACTIVATION OF AN APPLICATION OF THE PORTABLE MEMORY OF THE FIRST DEVICE BY A SECOND DEVICE

(76) Inventors: Olivier Joffray, 74 de Grasse Village, Feucherolles (FR) F-78810; Serge Barbe, 36-38 Rue de la Princesse BP 45, Louveciennes (FR) F-78431

( * ) Notice: Subject to any disclaimer, the term of this patent is extended or adjusted under 35 U.S.C. 154(b) by 0 days.

(21) Appl. No.: 10/564,321

(22) PCT Filed: Jul. 12, 2004

(86) PCT No.: PCT/IB2004/002255

§ 371 (c)(1),
(2), (4) Date: Jan. 11, 2006

(87) PCT Pub. No.: WO2005/006265

PCT Pub. Date: Jan. 20, 2005

(65) Prior Publication Data

US 2006/0136550 A1    Jun. 22, 2006

(30) Foreign Application Priority Data

Jul. 11, 2003    (EP)    .................................. 03291725

(51) Int. Cl.
*H04B 1/38*    (2006.01)
(52) U.S. Cl. .................................. 455/557; 455/556.1
(58) Field of Classification Search ............. 455/550.1, 455/556.1, 557
See application file for complete search history.

(56) References Cited

U.S. PATENT DOCUMENTS

| 7,088,709 B1 * | 8/2006 | Brieskorn .................... 370/357 |
| 2002/0006786 A1 * | 1/2002 | Mine .......................... 455/414 |

* cited by examiner

*Primary Examiner*—Temica Beamer

(57) ABSTRACT

The invention concerns a first device for delivering a service using an application lodged in a portable object, comprising a portable object reader for receiving the portable object, the portable object incorporating at least one application and the first device including resources for activating the application, characterized in that it includes a relay arranged for performing a communication between the portable object reader and a second device external to the first device and connected thereto so that the second device activates at least one application of the portable object independently of the resources.

10 Claims, 4 Drawing Sheets

DEVICE DELIVERING A SERVICE USING AN ASSOCIATED PORTABLE MEMORY, AND RELAYING MEANS FOR ALLOWING ACTIVATION OF AN APPLICATION OF THE PORTABLE MEMORY OF THE FIRST DEVICE BY A SECOND DEVICE

BACKGROUND AND SUMMARY OF THE INVENTION

1. Technical Application Field

The invention relates to a first device for delivering a service using an application lodged in a portable object, comprising a portable object reader for receiving said portable object, the portable object incorporating at least one application and the first device including resources for activating said application. The general problem to be solved is to allow, beside usual activation of an application of the portable object by the resident resources of the first device, activation of an application of the portable object by a second device, independently of said resident resources.

This Feature Offers Several Advantages, in Particular:
 in case the resources of the first device are regarded as too limited for certain management operations of the application (for example, the keyboard and display are small), activation by the second device may offer extended resources;
 for executing certain operations of the application, it may be desired or even required that only said second device will manage said operations. For example, it may be decided that some secure operations such as a funds transfer with the portable object will be only possible if executed by said second device.

The wording "portable object" includes any object able to lodge an application, such as a memory card or a microcontroller card (smart card).

BRIEF DESCRIPTION OF THE DRAWINGS

The present invention will be explained based on the following drawings.

DETAILED DESCRIPTION OF THE INVENTION

2 State of the Art

Since a preferred embodiment of the invention uses the USB technology, a short reminder of the latter is now made.

2.1 Introduction to the USB Technology

The USB technology is defined by a standard described in the "*Universal Serial Bus specification*". Details can be found in this document accessible on Internet site www.usb.org. The USB physical interconnect is a tiered start made of three types of devices:
 1. The USB root that is hold by a host device such as a PC (Personal Computer).
 2. The USB HUB (interconnect). There is at least one HUB in a USB that is the root HUB. There may be up to five levels of HUB on the same bus.
 3. The USB functions that are always connected to a HUB. It may be a scanner, a printer, a joystick. . . .

Figure 1:
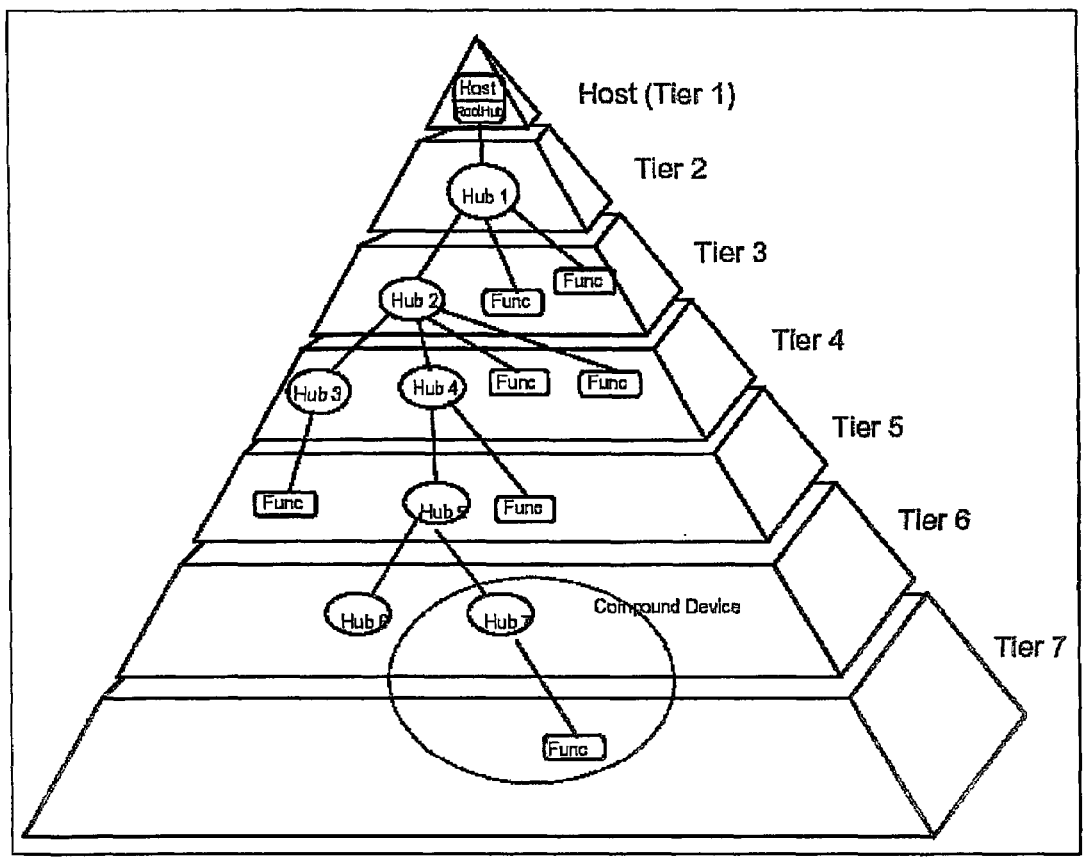
FIG. 1 illustrates the known USB bus topology.

FIG. 1 describes the USB topology. Objects named "Func" are the USB functions (printer, scanner . . . ):

2.2 Compound Device

A compound device is a unique physical device that combines one or more functions with a HUB in a single package. There might be a single chip, or a more complicated electronic device combining several electronic components.

2.3 Virtual Device and Real Device

In the USB standard, a real device (i.e. a scanner, a printer . . . ) is always coupled with a virtual device that is the device driver allowing the computer application to access to the real device functions.

In case of a compound device, it is associated with a least 2 virtual devices (1 for the HUB and 1 per function).

2.4 Example of an Application Using a WEB Sever Embedded in a Smart Card

Figure 2:
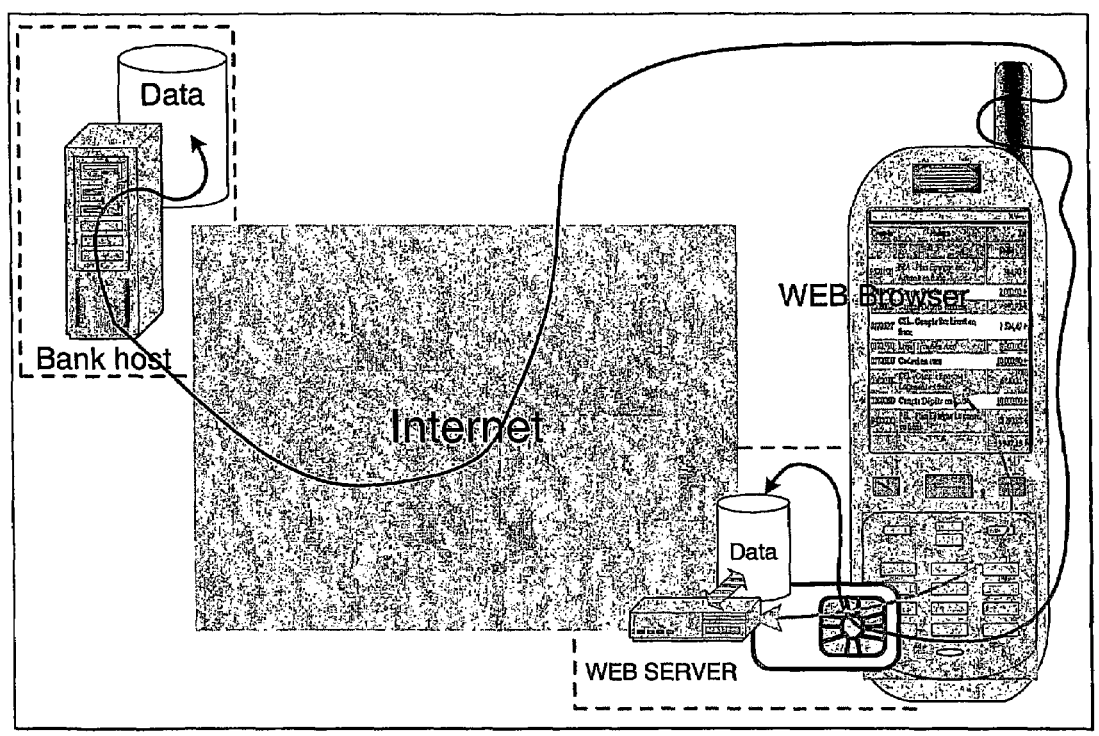
FIG. 2 illustrates a smart card based WEB server application.

In FIG. 2, secure areas are surrounded with a dashed rectangle. This ensures the user data are held in secure places.

It works as follows:
 Regularly, and preferably when the network is underused, the smart card and the bank server synchronize the user data. The bank transfers both the data to display in an XML file and the pages format in an HTML file. Locally, the smart card WEB server is able to prepare the HTML pages including the data in order to answer to the handset browser queries with a ready to use HTML page.
 When the user wants to browse its account, it can require the handset browser to query the smart card WEB server instead of accessing to the bank server.

2.5 The Improvement Proposed

The application presented chapter 2.4 is interesting, but the user interface is limited by the handset keyboard and display.

The goal of the present invention in this context is to allow the user to browse the smart card content from its PC, without having to remove the card from the handset.

One should not think the invention is limited to the WEB server. It also applies to all the data and applications embedded in the smart card. Furthermore, the invention is applicable, not only to smart cards, but also to any combination where a removable device is coupled to another device that may be in relation with a $3^{rd}$ device itself compatible with the removable device mentioned here above.

3 The Invention

For achieving this goal, the invention concerns a first device for delivering a service using an application lodged in a portable object, comprising a portable object reader for receiving said portable object, the portable object incorporating at least one application and the first device including resources for activating said application, characterized in that it includes relay means arranged for performing a communication between said portable object reader and a second device external to said first device and connected thereto so that the second device activates at least one application of the portable object independently of said resources.

The invention described herein may be used to have access to any application provided by a mobile communication handset embedding a smart card (e.g. GSM, WCDMA . . . ) but not exclusively.

Figure 3:
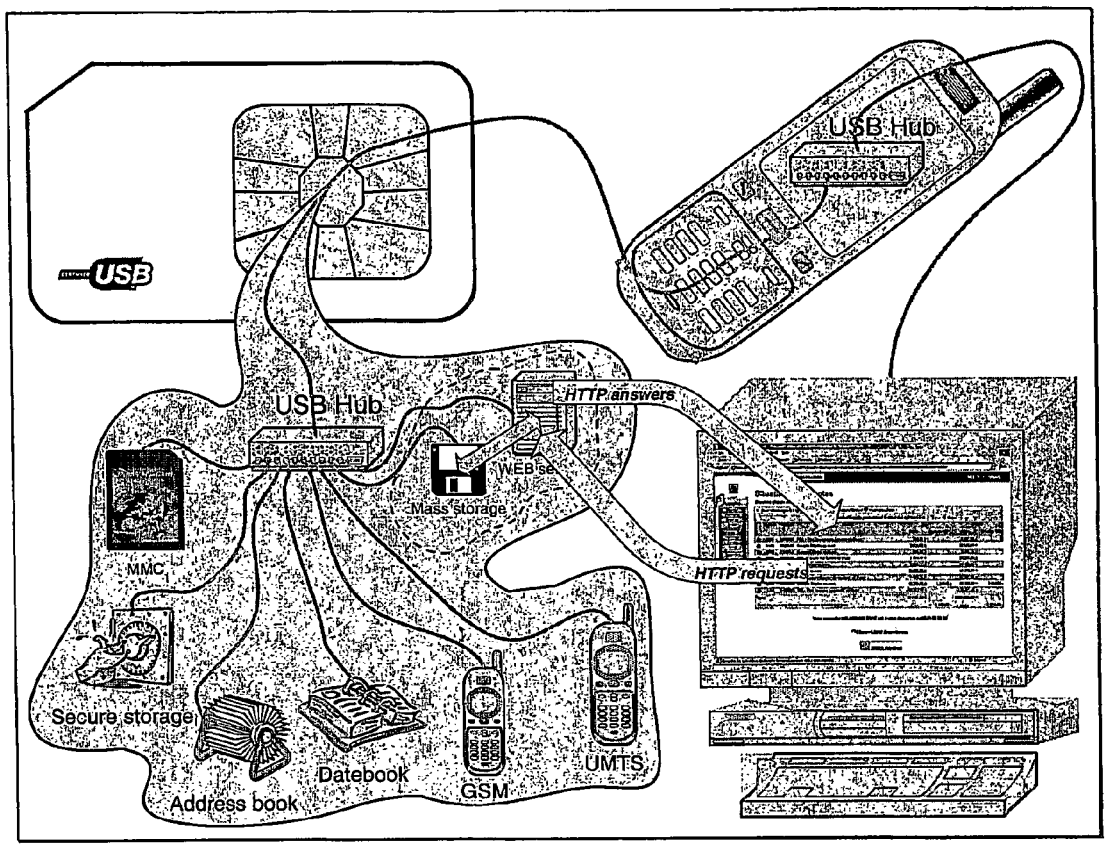
FIG. 3 illustrates the invention, the first device being constituted by a HUB cellular handset.

In FIG. 3, a browser in the PC queries a WEB server present in a USB SIM card through a USB HUB present in the cellular handset.

Beyond the cellular handset, the invention is applicable to any portable device subject to behave as an intermediate between another portable device it embeds—such as a smart card—and another equipment that has access to the embedded device exactly as if the connection was realized without any intermediate.

More Particularly, the Invention Comprises the Following Features:

1. Implementing a relaying function on a device A in which the smart card is inserted.
    This function may be realized using different means, depending on the communication capabilities of the communicating object. For instance, one could use the Internet Protocol, the USB or mixing both on the device A. In FIG. 3, the relaying function is constituted by the USB HUB in the cellular handset.
2. This relaying function is used to establish a link between the smart card and a device B (here, a PC). In the example of FIG. 3, the expected advantage is using some improved display and entry peripheral comparing with the ones existing on the device A. According to the USB technology, the smart card includes at least one USB device. Here, it includes several devices, so that it also includes a corresponding USB HUB for giving access to any USB device. Any application of the card, shown on FIG. 3, may be reached by device B through USB HUB of the cellular handset and USB HUB of the card.
    Whatever the technology concerned, device B has access to the card through the relaying function and a card reader usually provided in the cellular handset. Typically but not exclusively, signals emanating from device B are managed by the relaying function, bypassing the known resources of the cellular handset (at least mobile communication application, keyboard and display). Then, the relaying function sends corresponding signals to the card, through the card reader. The same path is used for signals emanating from the card and destined to device B, that is through the card reader then through the relaying function.
3. The link between the smart card and the device B is established in a such a way that the device B may have no idea that the smart card is in reality inserted in a device A that may natively be conceived as a peripheral for the device B.
4. The type of link or protocol used between the smart card and the device A, the device A and the device B, or the smart card and the device B has no importance, assuming there is no technical impossibility (e.g. speed concerns). The protocols and/or the physical means used can be different.
5. Defining a link including the device A, the device B and the smart card is the minimum, but several other devices might be inserted in any place of the link.

Some advantages of the invention:
1. Having access to the smart card from the device B makes the user more comfortable to manage the data in the card (whatever the data are).
2. If the device B is equipped with an Internet connection (for example), the applications embedded in the smart card could take advantage of this connection to upload and/or download data.
3. Simplifying the access to the card in such a way may help to use the secure area that is the card.

4 Implementation Example 4.1 Introduction

This example consists on securely browsing banking accounts from a cellular handset at any time (i.e. even if the network is not available), and being also able browsing the same data from a PC browser with a better user interface (taking advantages of the PC display, keyboard, mouse and more).

It uses the following:
An advanced cellular handset connected to the Internet, compatible with USB smart cards, and embedding the relaying function by including a USB HUB.
A USB SIM card embedding a WEB server (might be programmed in Java for example).
A bank WEB server to exchange data with WEB server in the SIM, or to browse user accounts using a standard WEB browser (e.g. Internet Explorer or Netscape-registered trademarks).
A PC embedding a USB host (and root HUB) as shown in Tier 1 of FIG. 1, a USB plug, etc.

4.2 Components Characteristics 4.2.1 Cellular Handset Characteristics

The cellular handset shall be immediately connected to the Internet when, being compatible with GPRS or UMTS standards, it recognizes the network. It shall have an IP address that may change at each startup (a fixed IP address is not mandatory). Of course, depending on the network status, the IP link may sometimes be broken.

A standard WEB browser is available on the cellular handset. It may be alternatively connected to a server over the wireless connection, or to the server in the SIM (see §4.2.2). From the browser standpoint there are no differences. Every server involved has an IP address.

The handset and the card are connected using a USB. The SIM, UMTS, GRPS or any other applications are viewed as USB devices.

The handset is directly connected to an external USB host such as a PC. It becomes a USB HUB (see FIG. 3).

From the SIM standpoint, the cellular handset is a USB HUB that is connected to a host.

The handset cannot access the GSM, GPRS and/or some other USB devices as it is just behaving as a USB HUB (this is for the example, but technical solutions can be implemented to allow the handset continuing having access to the application that may not interest the USB root to which it is connected).

4.2.2 SIM Card Characteristics

In this Example, the SIM Card Embeds at Least the Following:
The SIM standards requirements to allow the handset to have access to the cellular network (i.e. the GSM, the GPRS and/or equivalent applications).

A WEB server able replying to incoming queries and to exchange files with a distant server (using FTP or HTTP protocol for instance).

An XML parser.

Cryptographic means to manage keys, encrypt, decrypt, sign.

Preferably, a JavaCard virtual machine.

All complementary software and drivers to make all elements listed here above to interact.

The handset has access to the card through a USB. It detects a USB HUB followed by several USB devices.

The card embeds a USB HUB and a WEB server. The WEB server virtual device (i.e. device driver) implemented on the handset makes it accessible using IP (Internet Protocol). The card becomes an Internet node. Any equipment able to have access to this USB, and having the correct device driver, can have access to the card WEB server like any other WEB server, thus using an IP address.

The IP frames are encapsulated in USB protocol, and the device drivers, both on the handset and on the card, provide the interface masking the real data transport mean.

When the USB host detects that the card embeds a USB device that is a WEB server, it performs the required operation to allocate it an IP address.

4.2.3 WEB Server Characteristics

The (distant) WEB server is a standard server embedding means to exchange files with the SIM card WEB server.

4.2.4 Complementary Characteristics

The bank server and the card server should share some cryptographic keys in order to exchange files and/or queries securely (in order to protect the user banking information). The protocol used here is not important as long as the security level is strong enough. There are many standard solutions existing to solve this concern. One of them is using the PKI (Public key Infrastructure) architecture.

4.3 Secure Off-Line Banking Accounts Browsing

Figure 4:
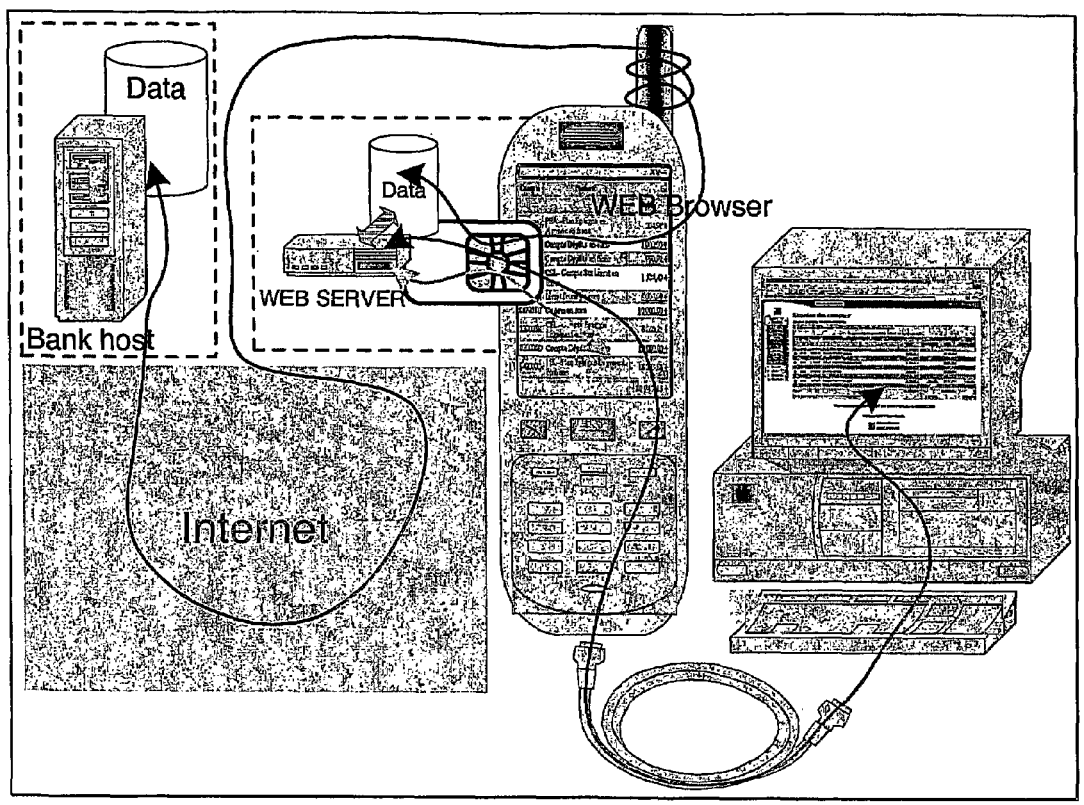
FIG. 4 illustrates the invention applied to a secure off-line banking accounts browsing architecture.

FIG. 4 shows the architecture of the example, using the components described in paragraph 4.2.

The handset behavior is the one of a device embedding a USB HUB device.

The handset is connected to a USB host. This host shows the USB HUB in the handset, followed by the one in the smart card, followed by the devices in the smart card, particularly the WEB server.

The host has the required virtual devices (i.e. the device driver) at its disposal. It is these virtual devices that encapsulate the IP frame to make it compatible with the USB.

The WEB server device in the smart card is consequently accessible from the host (i.e. the PC) like any other IP node.

When the user wants to browse its banking information, it uses the browser of its PC (e.g. Netscape or Internet Explorer). He can have access to its banking information either by accessing the Internet, or by browsing its data locally by querying the WEB browser in the smart card.

When the PC (USB host) is connected to the Internet, the smart card. WEB server can take advantage of this situation to synchronize its databases with the bank ones.

The link between the handset and the PC does not need to be a USB one. The encapsulation process allows using any type of link such as BlueTooth, IP or any other compatible link. The relaying function in the cellular handset will be, in each particular case, adapted to the type of link chosen.

4.4 Alternate Solutions

The entire example described here above is based on the USB protocol. Of course, many other protocols can also match the requirement. One could imagine a smart card and a handset natively embedding the IP. Then, the switching operation from the USB root to the USB HUB function is not anymore required as the smart card and the handset both become an Internet node.

When connected to a PC, all the three participants are able to have access to each other with no other restrictions than the one defined by the IP specifications.

Although specific embodiments of the invention have been described and illustrated, the invention is not to be limited to the specific forms or arrangements of parts so descried and illustrated. The invention is limited only by the claim.

The invention claimed is:

1. An electronic system, said system comprising
a first device for delivering a service using an application lodged in a portable object, said first device comprising:
a portable object reader for receiving said portable object, said portable object incorporating at least one application and said first device including resources for activating said portable object application,
said first device further comprising relay means arranged for performing a communication between said portable object reader and a second device external to said first device and connected thereto so that said second device activates at least one application of said portable object independently of said resources.

2. The electronic system according to claim 1, wherein said portable object is removable from said portable object reader.

3. The electronic system according to claim 1, wherein said first device comprises a first keyboard and a first display, said second device comprises a second keyboard and a second display, said second keyboard being bigger than said first keyboard and said second display being bigger than said first display.

4. The electronic system according to claim 3, wherein said first device is a handset, said second device is a personal computer, and said portable object is a memory card.

5. The electronic system according to claim 1, wherein said first device is a handset, wherein said second device is a personal computer including a USB host, said handset comprising a USB HUB device, as relay means arranged for performing a communication between said portable object reader and said personal computer, said personal computer comprising a USB device driver, and said portable object being a smart card, said smart card including a USB device.

6. The electronic system according to claim 5, wherein said smart card includes a WEB server.

7. The electronic system according to claim 5, wherein said smart card further includes a USB HUB device, said smart card USB HUB device being linked to said smart card USB device.

8. The electronic system according to claim 5, wherein said handset comprises at least one communication application, a first keyboard and a first display.

9. The electronic system according to claim 5, wherein said personal computer comprises means for sending to said portable object at least one signal, through said handset USB HUB device and said portable object reader, so as to activate said at least one smart card application.

10. The electronic system according to claim 5, wherein said smart card comprises means for sending at least one signal to said personal computer through said handset USB HUB device and said portable object reader, so as to respond to said personal computer further to the execution of the activated application.

* * * * *